March 3, 1936.  K. BERGER  2,032,464
LEAD BLOCK
Filed Feb. 26, 1934  3 Sheets-Sheet 1
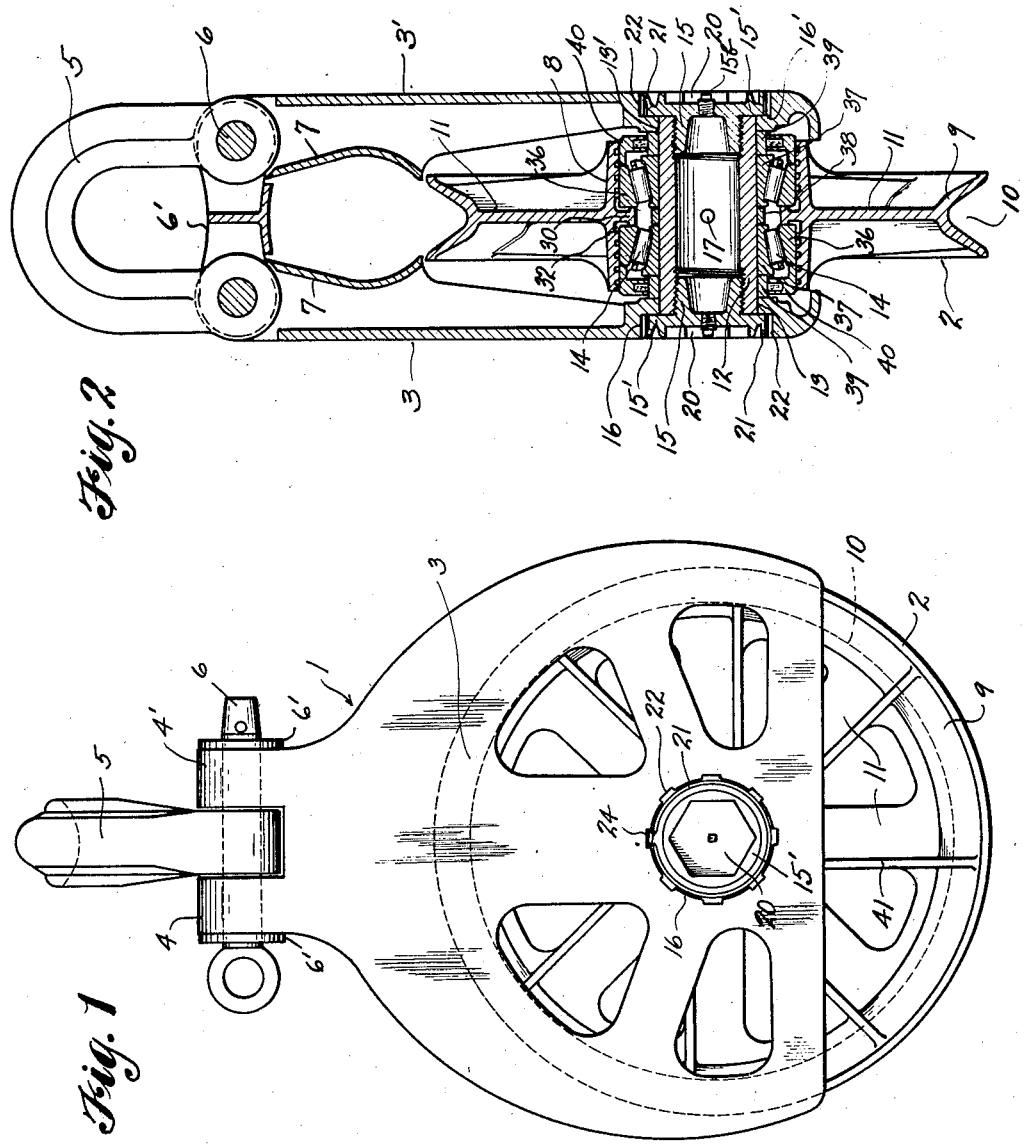
INVENTOR
KNUTE BERGER
BY
Cook & Robinson
ATTORNEY

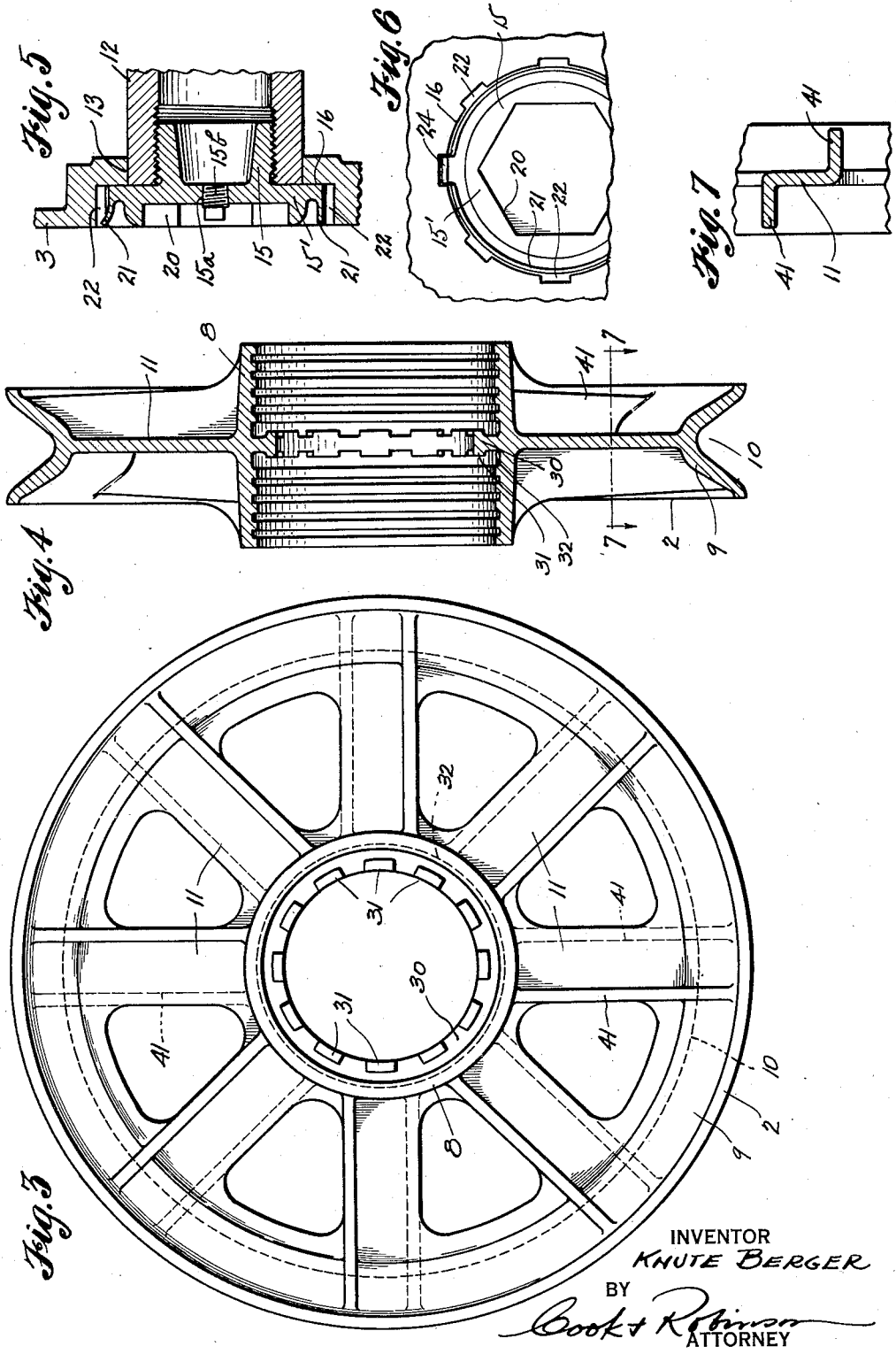

March 3, 1936.  K. BERGER  2,032,464
LEAD BLOCK
Filed Feb. 26, 1934  3 Sheets-Sheet 3
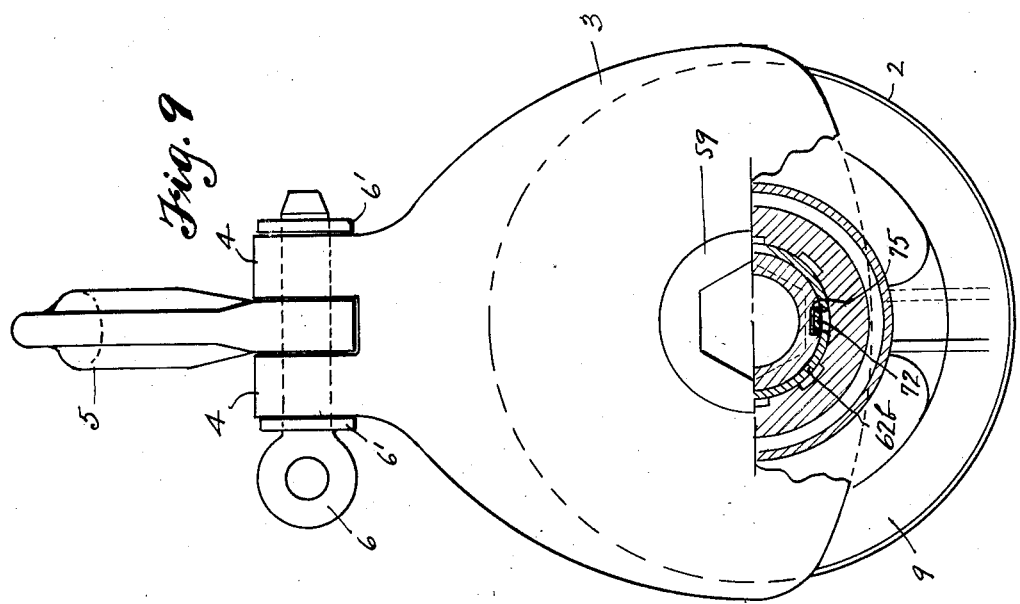
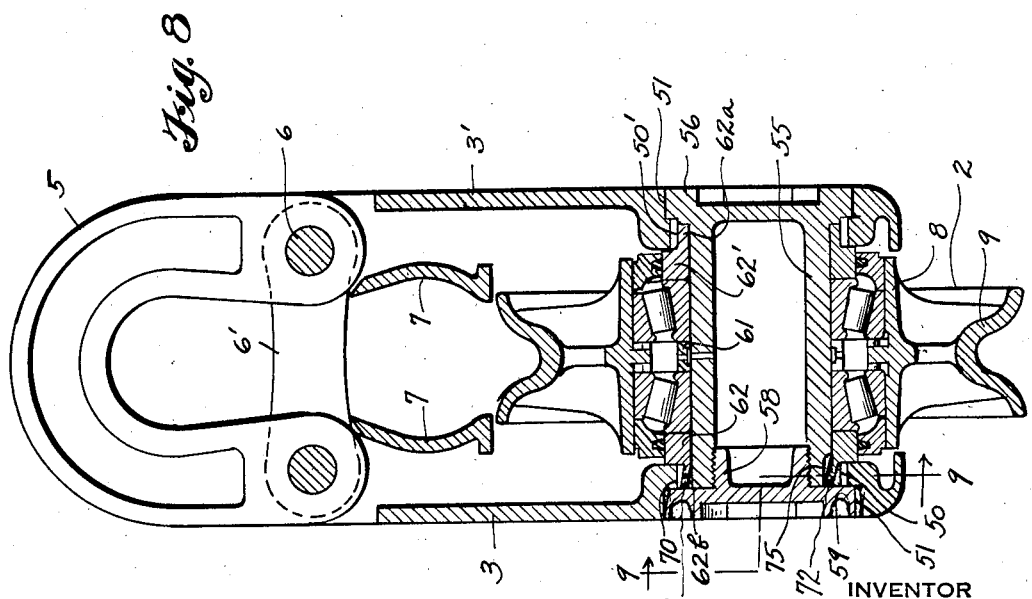
INVENTOR
KNUTE BERGER
BY
Cook & Robins
ATTORNEY Patented Mar. 3, 1936

2,032,464

UNITED STATES PATENT OFFICE 2,032,464

LEAD BLOCK

Knute Berger, Seattle, Wash.

Application February 26, 1934, Serial No. 712,884

7 Claims. (Cl. 308—18)

This invention relates to improvements in sheaves and sheave blocks and it has reference more particularly to what are commonly known in the logging industry as "lead blocks", that is, a block wherein a sheave is mounted to carry a running cable whereby logs or the like are transported or moved as in yarding.

Explanatory to the invention, it will be here stated that in the provision of anti-friction bearings in manganese sheaves, and particularly for taper roller bearings, it is necessary to consider end thrust. Thus it is a very important matter that proper and accurate shoulders be provided in the sheave hub against which the bearings may seat in a manner to insure accurate alinement. Heretofore, in such sheaves using paired sets of taper roller bearings, spacing collars have been employed between the two sets of bearings and these collars have either been expanded into an annular groove in the sheave hub, or pressed into the hub and secured by welding, or cast as a spacer in a recess in the sheave after the grinding operation. In each instance it has been difficult to obtain proper alinement of bearings.

Another difficulty has been to obtain a satisfactory means for positively locking the axle or pivot pin of the sheave that can be readily and easily removed for disassembling the parts when this is desired.

Still another difficulty has been to prevent overheating of the block by reason of the friction of the cable operating about the sheave at high speed.

In view of the above, and for other reasons, the principal objects of the present invention reside in the following features of construction:

First, in the provision within the sheave wheel hub of an integrally cast, spacer ring for the paired anti-friction bearings on which the sheave is mounted; this ring having projecting buttons formed on its opposite sides adapted to be ground down to accurately seat the bearings; the ring also having annular grooves undercutting the buttons at the corners formed at the opposite sides of the ring where it joins the sheave hub, thereby to provide for greater accuracy in and less time required for the surfacing and grinding of the buttons in preparing the seats against which the bearings rest and to provide clearance that prevents wearing away of the corner of the grinding wheel in grinding or surfacing the buttons.

Second, in the provision of a chambered or tubular mounting pin or axle for the sheave in which a supply of lubricant is contained and in the novel features of construction of retaining nuts whereby the pin is held securely in place. Also, in the provision of means for positively locking the retaining nuts against becoming loose incident to use of the block.

Third, the provision for quick and easy removal of a cable from the block without disassembling the sheave wheel therefrom.

Fourth, in the provision of a sheave wheel having spokes of a novel design whereby strength is added to the general construction and a cooling fan effect is automatically obtained incident to operation of the wheel.

Other objects of the invention reside in the details of construction and in the combination of parts embodied in the device whereby they are rendered easily assembled and disassembled.

In accomplishing these and other objects of the invention, I have provided the improved details of construction, the preferred forms of which are illustrated in the accompanying drawings, wherein—

Fig. 1 is a side elevation of a sheave and block embodying the novel features of the present invention.

Fig. 2 is a central, cross sectional view of the same.

Fig. 3 is a side view of the sheave wheel.

Fig. 4 is a cross section of the same.

Fig. 5 is an enlarged sectional view illustrating the locking nut construction.

Fig. 6 is a partial face view of the same parts.

Fig. 7 is a cross section on line 7—7 in Fig. 4 illustrating the spoke construction.

Fig. 8 is a sectional view of a sheave mounting of an alternative form of construction.

Fig. 9 is a cross section on line 9—9 in Fig. 8.

Referring more in detail to the drawings—

I designates, in its entirety, the sheave block and 2 designates the sheave wheel. The block, as seen best in Figs. 1 and 2, comprises an enclosing housing having separate and spaced opposite side plates 3 and 3' between which the wheel 2 is located, and at their top edges the plates have paired eyelets 4—4' between which the ends of an anchoring yoke 5 is secured by pins 6. A spacer link 6' extends between the plates and is held by the pins 6. There also are spaced guide flanges 7 cast with the side plates within the block closely adjacent the top of the sheave to prevent the cable jumping from the sheave wheel 2.

The wheel in the construction shown in Figs. 2 and 4, comprises a cylindrical hub portion 8, a rim portion 9 providing an annular seat or channel 10 for the cable, and integrally cast spokes 11 which support the rim from the hub. The sheave wheel is mounted in the block to revolve about a tubular axle or pin 12 which, in turn, is mounted at its ends in alined openings 13—13' in the side walls 3—3' of the block. The pin 12 is held in place by nuts 15 which have shanks threaded into its opposite ends. Also, the nuts have enlarged head portions 15' adapted to be tightened against the ends of the pin and also against the bottom surfaces of circular recesses 16—16' in the side walls of the block concentric of the axial line of the pin. It will be observed in Fig. 2 that the ends of the pin 12 terminate flush with the base surfaces of recesses 16—16' and then when the heads 15' of the nuts are tightened against these base surfaces, there can be no end play of the pin.

The pin 12 is hollow or chambered to hold a lubricant and the nuts 15 that are threaded into its opposite ends are tapped as at 15a and the taps fitted with plugs 15b, as in Fig. 5, to provide for filling and then sealing the pin chamber. A lateral port 17 in the pin permits passage of the lubricant to the bearings mounting the sheave.

The head portions 15' of the nuts 15 are circular, as seen in Fig. 1, and have coaxially located, outwardly opening wrench sockets 20. Also, each head has a peripheral flange 21 located close to the wall of the countersunk recess containing the nut, and the wall of the recess is provided at regular intervals with shallow notches 22 into any one of which a part of the nut flange may be outwardly deformed to lock the nut against rotation, as seen at 24 in Fig. 6. This locking is accomplished by applying an outwardly directed blow against that part of the nut flange 21 directly across the notch to break or bend it outwardly, thus to serve as a locking key. To release the nut for rotation, it is only necessary to bend the key portion of the flange back out of the notch by means of a chisel or punch.

The hub portion of the sheave is interiorly provided with an encircling, inwardly extending flange or collar 30; this being cast integrally with the hub, as distinguished from the usual pressed in or welded in ring. Cast on the opposite sides of the collar 30 are laterally projecting buttons 31 of uniform size and spacing and below the buttons, within the corners or angles provided by the hub and collar, are grooves 32 cut into the hub and collar as relief to facilitate the grinding operation and to prevent wear on the corner of the grinding tool used to face the buttons in preparing seats for the raceways of the bearings.

In preparing the hub for receiving the bearings, it is ground out to true cylindrical form to the diameter of the bearing cages or raceways that are to be fitted thereto. At the same time the hub is ground out the buttons are surfaced for abutment thereagainst of the outer raceways 36 of the taper roller bearings 14. The inner raceways 37 of these bearings are fitted to the pin 12 and have a spacer ring 38 between them, and there are spacer rings 39 fitted between the outer ends of the raceways 37 and face plates 3—3'. Thus, when the nuts are tightened against the pin ends and face plates, the spacers 39, raceways 37 and spacer 38 are clamped tightly together against longitudinal shifting on the pin. Sealing rings 40 are also fitted in the ends of the hub as seen in Fig. 2.

The spokes 11 connecting the hub and rim of the wheel differ from the usual construction in that they are provided along opposite edges with re-enforcing flanges 41 extending in opposite directions from the hub to the rim. In cross section the hub, as seen in Fig. 7, is of a sort of Z-angle form. This materially strengthens the spoke against bending, with the neutral axis from the center of the sheave extending through the spoke. Furthermore, in this construction each spoke serves in operation as the blade of a fan whereby a forced circulation of air is created to effectively cool the wheel and block regardless of the direction of rotation of the wheel. Cooling is obviously essential since it would cause expansion and a consequent loosening up of the bearings.

With the parts of the block and sheave constructed as above described, they may be easily and readily assembled by first locating the two sets of bearings in the hub against opposite sides of the integrally cast spacer ring, and with the sealing rings 40 and spacers 38 and 39 in place, then by locating the sheave in the block and applying the tubular pin through the sheave and openings 13—13' in the block and finally threading the nuts 15—15' into the pin and locking them by outsetting part or parts of the rim flanges 21 in the recesses 22.

When it is desired to disassemble the parts, it is only necessary to unlock one of the nuts 15—15' and push the pin 12 through, thus permitting the sheave to be removed from the block. This unlocking may readily be accomplished by disconnecting one face plate 3 or 3' from the yoke 5 and spacer 6', then rotating the plate which in turn will unscrew the nut 15 that is seated therein.

In Figs. 8 and 9 is illustrated an alternative construction in which the opposite face plates 3 and 3' of the block have axially alined openings 50 and 50' with countersunk recesses 51 and 51' about these openings in the outer sides of the plates. The sheave wheel is mounted on a tubular pivot pin 55 having an integral head 56 fitted in the countersink 51' at that side of the block. A nut is applied to the other end of the pin and this has a shank 58 threaded into the pin and an enlarged head 59 tightened against the end of the pin and also against the base of the countersink 51.

The sheave wheel is rotatably mounted on the paired taper bearings as in the device of Fig. 2 and the inner raceways are spaced apart by the spacer ring 61 and there are spacer rings 62—62' between the raceways and face plates.

The openings 50—50' in the face plates are of greater diameter than the pivot pin, and the spacer ring 62' has a concentric extension 62a of reduced outside diameter fitted in the opening 50' about the pin. Likewise, the spacer 62 has an annular coaxial extension 62b fitted in the opening 50 of plate 3 and this opening has notches 70 at intervals therein as seen in Fig. 9 into which a part of the ring extension 62b may be outwardly deformed as at 71, thereby to lock the ring against rotation relative to the plate. Likewise, the ring extension may at certain points be deformed inwardly as at 72, into notches 75 in the adjacent end of the pivot pin to lock the pin against rotation relative to the ring.

With this construction, as shown in Figs. 8 and 9, if it is desired to remove the cable loop from about the sheave, it is only necessary to disconnect face plate 3' from the yoke 5 and spacer 6' then to rotate it one half turn to provide a lateral opening from the top of the sheave. This rotation of the plate is about the extension of ring 62' and does not cause rotation of the pivot pin.

Therefore, no looseness will result in the setup and loss of adjustment is not possible. The head 59 of the locking nut is in this instance held against rotation by interlocking its peripheral flange in a notch of the face plate, in the same manner as is illustrated and described in connection with the device of Figs. 1 and 2.

Having thus described my invention, what I claim as new therein and desire to secure by Letters Patent is—

1. In a block of the character described having opposite side plates, an axle mounted at its ends in the plates and a sheave wheel revoluble about the axle; said wheel having an axially extended chamber receiving the axle and formed interiorly with an inwardly extending, encircling spacer ring integral with the wheel hub and formed on its opposite side faces with spaced, projecting buttons and an undercut clearance groove in the ring and chamber wall about the buttons, antifriction bearings fitted to the axle within opposite ends of the wheel chamber and having their outer raceways seated against the buttons projecting from opposite sides of the spacer ring.

2. In a device of the character described, a block having opposite face plates formed with axially alined openings an axle member having its opposite ends mounted in said openings and a sheave wheel revoluble about said axle member; nuts threaded into the ends of said axle member having heads extended to engage the plates about the openings to retain the axle against longitudinal movement; said face plates having countersink recesses about said openings to receive the heads of said nuts with notches formed in the walls of the countersinks and said nuts having rim portions adapted to be deformed outwardly into said notches to lock the nuts against turning.

3. In a device of the character described, a block having opposite face plates formed with axially alined openings therethrough and with countersunk recesses about the openings in the outer faces of the plates, each of said countersunk recesses having a flat bottom surface and having notches in its side walls, an axle member, a sheave wheel revoluble thereon; said axle having ends fitted in said wall openings and terminating at its ends flush with the bottom walls of the countersunk recesses and nuts having shanks threaded into the ends of said axle and having enlarged heads adapted to be tightened against the said ends and to seat against the bottom walls of said recesses thereby to lock the axle in place; said nut heads having encircling rim flanges adapted to be deformed outwardly into said notches to lock them against turning.

4. A device as in claim 3 wherein the axle member is tubular and has a lateral outlet for a lubricant that may be contained in the tubular chamber, and wherein the nuts are tapped to provide for filling the tubular chamber and have plugs removably applied to said taps.

5. A block having a face plate formed with a circular opening and having one or more notches about the opening, an axial pin mounted in the block with one end extended into said plate opening and provided about that end with one or more notches, a sheave wheel revoluble on the pin, a bearing supporting the wheel on the pin and a spacer ring fitted to the pin between the face plate and said bearing having an annular extension fitted in said plate opening adapted to be deformed into said plate and pin notches to lock the pin and plate against relative rotation.

6. A block having opposite face plates formed with circular, alined openings with notches about the openings, an axial pin mounted with ends disposed in said openings, said pin having a head at one end, and having notches about its opposite end, a sheave wheel on the pin, bearings supporting the wheel revolubly on the pin, spacer rings disposed between the bearings and face plates and having annular extensions fitted about the pin and extended into said face plate openings and adapted to be deformed into said plate and pin notches to prevent rotation of the pin relative to the face plate.

7. A device as in claim 6 wherein one of said face plates has a revoluble mounting between the head of said pin and the spacer ring adjacent thereto.

KNUTE BERGER.